US009999936B2

(12) United States Patent
Nishimura et al.

(10) Patent No.: US 9,999,936 B2
(45) Date of Patent: Jun. 19, 2018

(54) SOLDER WIRE BOBBINLESS COIL

(71) Applicant: NIHON SUPERIOR CO., LTD., Osaka (JP)

(72) Inventors: Tetsuro Nishimura, Osaka (JP); Yutaka Fukushima, Osaka (JP); Hideki Yoshida, Osaka (JP)

(73) Assignee: NIHON SUPERIOR CO., LTD., Osaka (JP)

( * ) Notice: Subject to any disclaimer, the term of this patent is extended or adjusted under 35 U.S.C. 154(b) by 156 days.

(21) Appl. No.: 15/183,895

(22) Filed: Jun. 16, 2016

(65) Prior Publication Data

US 2016/0375517 A1   Dec. 29, 2016

(30) Foreign Application Priority Data

Jun. 23, 2015  (JP) .................................. 2015-125596

(51) Int. Cl.
*B23K 3/06* (2006.01)
*B23K 35/02* (2006.01)

(52) U.S. Cl.
CPC .......... *B23K 3/063* (2013.01); *B23K 35/0227* (2013.01)

(58) Field of Classification Search
None
See application file for complete search history.

(56) References Cited

U.S. PATENT DOCUMENTS

| 2,372,859 | A | * | 4/1945 | Sparks | ............... B23K 35/0227 |
| | | | | | 206/389 |
| 4,204,597 | A | * | 5/1980 | Fischer | .................... B23K 3/08 |
| | | | | | 206/216 |
| 4,236,295 | A | * | 12/1980 | Nakamura | .............. F02B 71/00 |
| | | | | | 29/598 |
| 4,463,276 | A | * | 7/1984 | Nakamura | ............... H02K 3/04 |
| | | | | | 310/198 |

FOREIGN PATENT DOCUMENTS

| JP | 2001-88882 A | | 4/2001 |
| SU | 500966 A | * | 3/1976 |

OTHER PUBLICATIONS

Kester Solder Wire Coil, 2010, p. 1-21.*

* cited by examiner

*Primary Examiner* — Devang R Patel
(74) *Attorney, Agent, or Firm* — Nakanishi IP Associates, LLC

(57) ABSTRACT

A solder wire bobbinless coil includes a solder wire coil formed by winding a solder wire into a hollow columnar, the solder wire coil having a first coil opening at one end of the hollow columnar, and a second coil opening at the other end of the hollow columnar; and a covering film covering an outer surface of the solder wire coil. The covering film has a first film opening smaller than the first coil opening on a portion covering the first coil opening and a second film opening equal to or smaller than the second coil opening on a portion covering the second coil opening, and the first film opening includes, at a peripheral area thereof, a first protruding portion extending so as to protrude to an inner side of the first coil opening.

6 Claims, 7 Drawing Sheets

[Fig. 1]
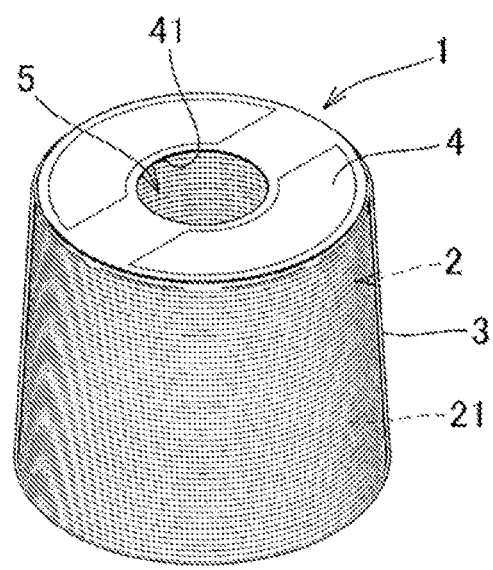

[Fig. 2]
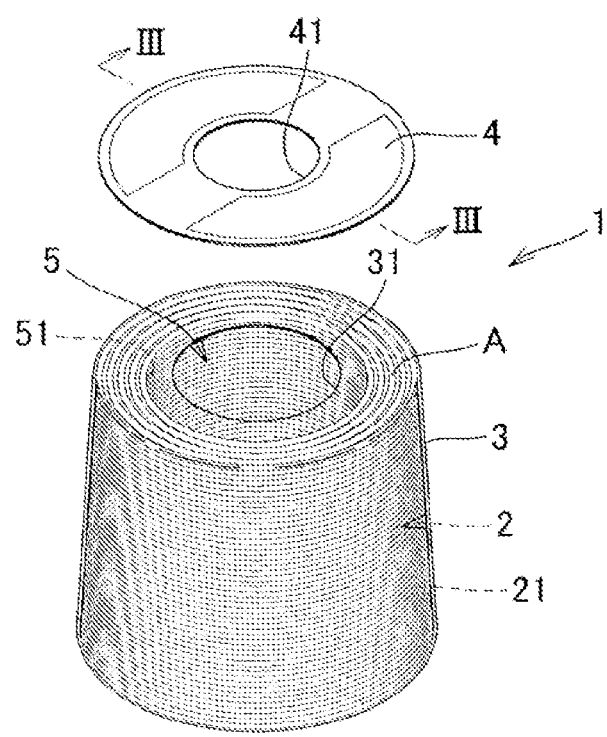

[Fig. 3]
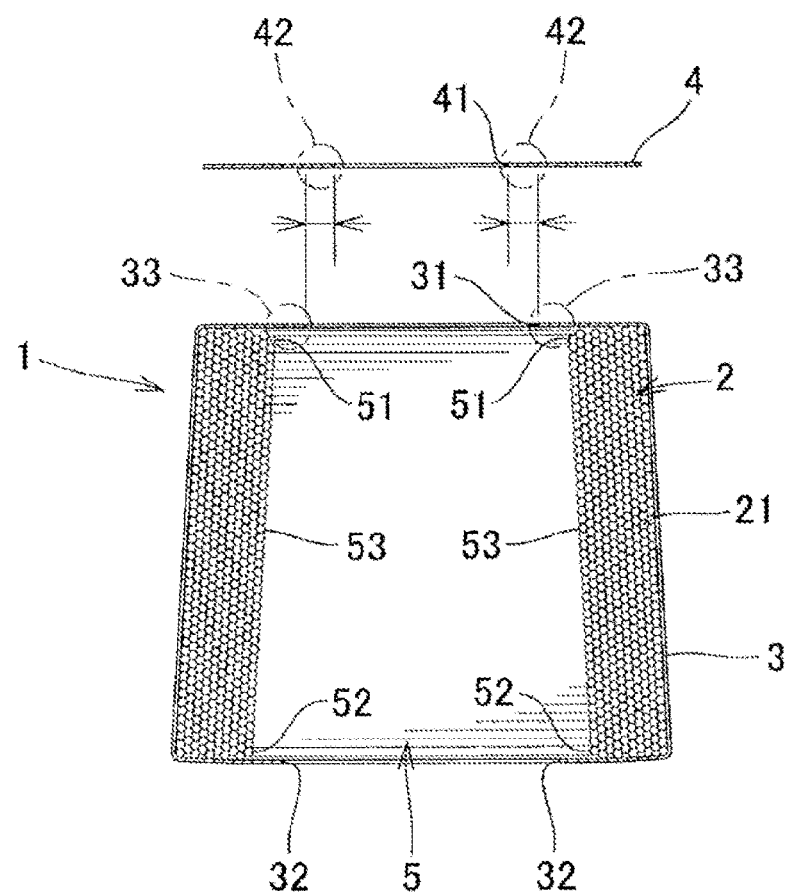

[Fig. 4]
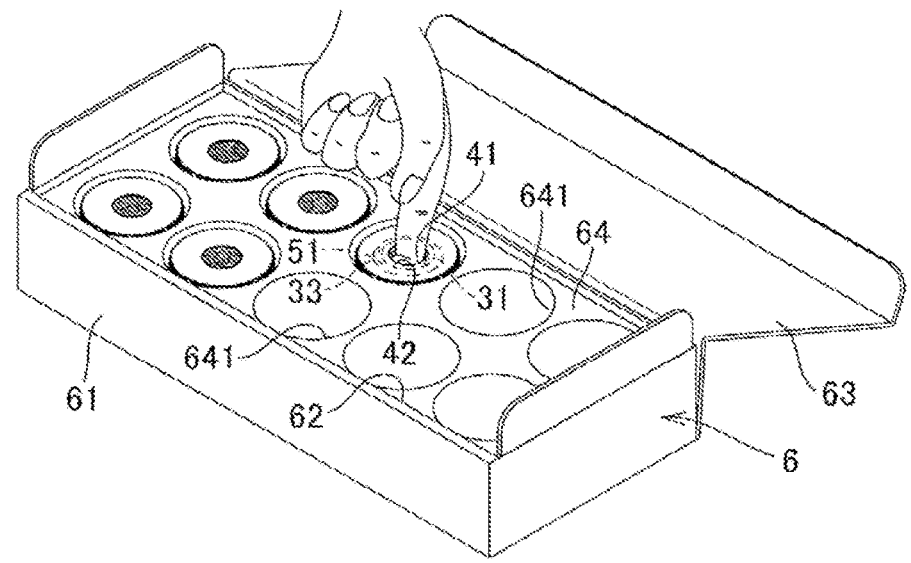
[Fig. 5]
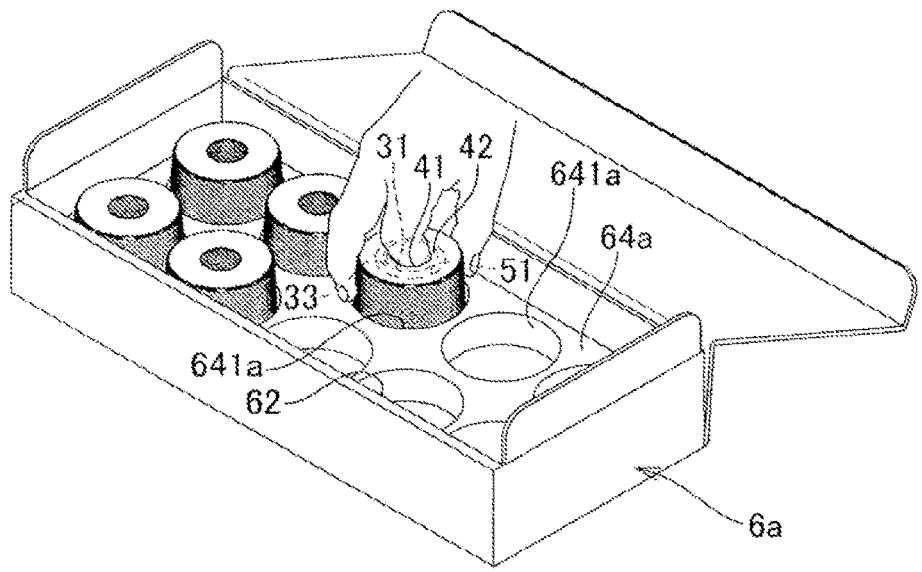

[Fig. 6]
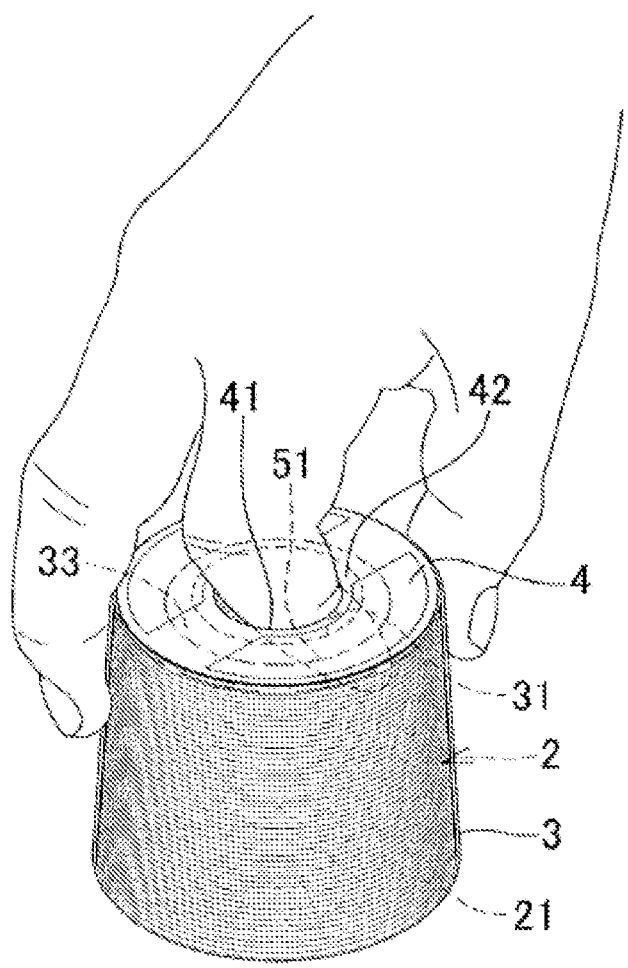

[Fig. 7]
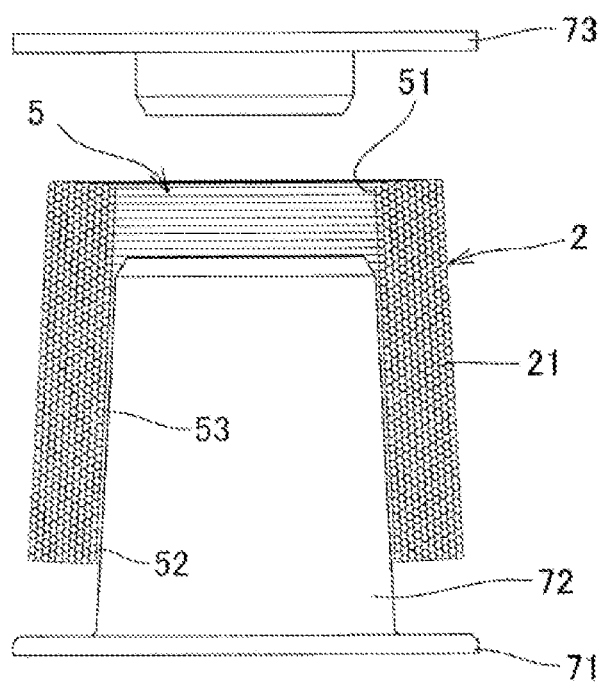

[Fig. 8]
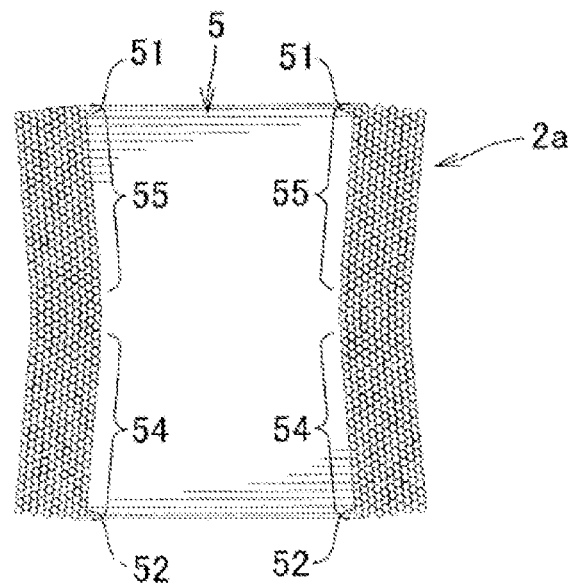

SOLDER WIRE BOBBINLESS COIL

TECHNICAL FIELD

The present invention relates to a solder wire bobbinless coil formed by winding a solder wire into a hollow columnar form.

BACKGROUND ART

Conventionally, known has been a solder wire bobbinless coil including a hollow columnar main body provided by detaching a bobbin from a bobbin coil formed by a solder wire wound around the bobbin (for example, see Patent Document 1). In the solder wire bobbinless coil, a portion of one end surface of the main body excluding a hollow portion, the outer circumferential surface of the main body, and the other end surface thereof are covered by a heat-shrinkable film, and the solder wire is drawn out from the hollow portion that is not covered by the heat-shrinkable film and is opened.

CITATION LIST

Patent Literatures

Patent Document 1: JP-A No. 2001-88882

The above-described solder wire bobbinless coil is, however, an ingot of metal formed by winding solder into the hollow columnar form, and is as large as a first of a person and has a weight of approximately 0.5 kg. Further, the outer circumference thereof is smoothly covered by the heat-shrinkable film. Because of this, the solder wire bobbinless coil has a disadvantage that it is slippery when held with a user's hand and a user is easy to drop it due to its weight.

SUMMARY OF INVENTION

One or more aspects of the present invention are directed to a solder wire bobbinless coil that a user is difficult to drop when the user holds it with his (her) hand.

A solder wire bobbinless coil according to an aspect of the invention includes a solder wire coil formed by winding a solder wire into a hollow columnar, the solder wire coil having a first coil opening at one end of the hollow columnar, and a second coil opening at the other end of the hollow columnar; and a covering film covering an outer surface of the solder wire coil, wherein the covering film has a first film opening smaller than the first coil opening on a portion covering the first coil opening and a second film opening equal to or smaller than the second coil opening on a portion covering the second coil opening, and the first film opening includes, at a peripheral area thereof, a first protruding portion extending so as to protrude to an inner side of the first coil opening.

With this configuration, a user can hold the solder wire bobbinless coil by inserting his (her) finger through the first film opening and hooking the finger to the first protruding portion. Therefore, when the user holds the solder wire bobbinless coil with his (her) hand, he (she) is difficult to drop the solder wire bobbinless coil.

Further, it is preferable that the first film opening be smaller than the second film opening.

With this configuration, the second film opening that is not required to enable the user to hook his (her) finger thereto is larger than the first film opening, thereby reducing the area of the covering film. Accordingly, the covering film is reduced in cost.

Further, it is preferable that a label on which a label opening equal to or smaller than the first film opening is formed at a substantially center position be bonded to an outer surface of a first end surface region of the covering film, which covers an end surface of the solder wire coil at the one end side.

With this configuration, the label covers the first protruding portion, so that the first protruding portion is reinforced.

In addition, it is preferable that the label opening includes, at a peripheral area thereof, a second protruding portion extending so as to protrude to an inner side of the first protruding portion.

With this configuration, the user can insert his (her) finger through the label opening and the first film opening and hook the finger to the first and second protruding portions. Therefore, the user is easy to hook his (her) finger to the solder wire bobbinless coil.

Moreover, it is preferable that an inner wall of the hollow portion have an other end-side reduced diameter portion which is reduced in diameter as is farther from the second coil opening along an axial line direction of the solder wire coil.

With this configuration, attachment of a bobbin to the solder wire coil becomes easy.

Further, it is preferable that the inner wall of the hollow portion be reduced in diameter as is farther from the second coil opening to the first coil opening along the axial line direction of the solder wire coil.

With this configuration, when the solder wire coil is manufactured, detachment of a solder wire winding-up tool from the solder wire coil becomes easy. Therefore, the solder wire coil is manufactured easily.

Moreover, it is preferable that the inner wall of the hollow portion have a one end-side reduced diameter portion which is reduced in diameter as is farther from the first coil opening along the axial line direction of the solder wire coil.

With this configuration, even when the bobbin is attached through any one of the openings of the hollow portion at both sides, the attachment of the bobbin to the solder wire coil becomes easy.

In addition, it is preferable that a thickness of the first protruding portion of the covering film be larger than a thickness of the portion of the covering film, which covers the outer circumferential surface of the solder wire coil.

With this configuration, the thickness of the covering film is set such that the thickness of the portion thereof which covers the outer circumferential surface of the solder wire coil is decreased and the thickness of the first protruding portion supporting the weight of the solder wire coil when the user hooks his (her) finger thereto is increased. Therefore, the strength of the first protruding portion can be increased while reducing the covering film in cost.

Advantageous Effects of Invention

The solder wire bobbinless coil having this configuration enables a user to be difficult to drop when he (she) holds it with his (her) hand.

BRIEF DESCRIPTION OF DRAWINGS

FIG. 1 is a perspective view illustrating an example of the configuration of a solder wire bobbinless coil according to an embodiment of the present invention;

FIG. 2 is a descriptive view for explaining a state where a label is detached from the solder wire bobbinless coil as illustrated in FIG. 1;

FIG. 3 is a cross-sectional view of the solder wire bobbinless coil as illustrated in FIG. 2 when cut along a line III-III;

FIG. 4 is a descriptive view for explaining a state where the solder wire bobbinless coil as illustrated in FIG. 1 is packed in a package box;

FIG. 5 is a descriptive view for explaining another example of the package box as illustrated in FIG. 4;

FIG. 6 is a descriptive view for explaining a state where a user holds the solder wire bobbinless coil with his (her) hand;

FIG. 7 is a descriptive view for explaining attachment of a bobbin to a solder wire coil; and FIG. 8 is a cross-sectional view illustrating another example of the solder wire coil.

DESCRIPTION OF EMBODIMENTS

Hereinafter, an embodiment of the present invention will be described with reference to the drawings. It should be noted that constituent components denoted by the same reference numerals in the drawings indicate the same constituent components and description thereof is omitted. FIG. 1 is a perspective view illustrating an example of the configuration of a solder wire bobbinless coil according to an embodiment of the present invention. A solder wire bobbinless coil 1 as illustrated in FIG. 1 includes a solder wire coil 2 formed by winding a solder wire 21 into a hollow columnar form, a covering film 3 covering the outer surface of the solder wire coil 2, and a substantially circular label 4 that is bonded to one end side (upper surface in FIG. 1) of the solder wire bobbinless coil 1.

The solder wire 21 of the solder wire bobbinless coil 1 can be made of various materials and have various thicknesses, diameters, inner diameters, lengths in the axial line direction, and the like. The diameter of the solder wire 21 is approximately 0.05 mm to 3.0 mm, for example. The weight of solder wire bobbinless coil 1 is 0.5 kg, the diameter thereof in the vicinity of the center is 63 mm, the inner diameter thereof is 41 mm, and the length thereof in the axial line direction is 59 mm, for example. It should be noted that in the following description, the diameter and the inner diameter of the solder wire bobbinless coil 1 or the solder wire coil 2 are set based on lines connecting peaks of the solder wire 21 forming them.

FIG. 2 is a descriptive view for explaining a state where the label 4 is detached from the solder wire bobbinless coil 1 as illustrated in FIG. 1. FIG. 3 is a cross-sectional view of the solder wire bobbinless coil 1 as illustrated in FIG. 2 when cut along a line III-III. As illustrated in FIG. 2 and FIG. 3, a hollow portion 5 penetrating through the solder wire coil 2 in a columnar form in the axial direction is formed at substantially the center of the solder wire coil 2. The hollow portion 5 has a first coil opening 51 as an opening of the hollow portion 5 at one end side and a second coil opening 52 as an opening of the hollow portion 5 at the other end side. An inner wall 53 of the hollow portion 5 has a tapered shape which is reduced in diameter as is farther from the second coil opening 52 to the first coil opening 51 along the axial line direction of the solder wire coil 2.

The solder wire coil 2 can be formed by winding the solder wire 21 around a conical or truncated conical bobbin for manufacturing, for example, and detaching the bobbin for manufacturing. The solder wire coil 2 has the tapered shape which is reduced in diameter as is farther from the second coil opening 52 along the axial line direction of the solder wire coil 2. Therefore, the bobbin for manufacturing can be detached easily after the solder wire coil 2 is formed.

The covering film 3 has a substantially circular first film opening 31 and a substantially circular second film opening 32. The first film opening 31 has a diameter smaller than that of the first coil opening 51 on a portion covering the first coil opening 51. The diameter of the second film opening 32 is set to be equal to or smaller than that of the second coil opening 52 on a portion covering the second coil opening 52, for example, to be substantially equal to that of the second coil opening 52.

The first film opening 31 has the diameter smaller than that of the first coil opening 51, so that a first protruding portion 33 extending so as to protrude to the inner side of the first coil opening 51 is formed by the covering film 3. With this, the user can hold the solder wire bobbinless coil 1 by hooking his (her) finger to the first protruding portion 33. Therefore, the user is difficult to drop it when holding the solder wire bobbinless coil 1 with his (her) hand.

The radius of the first film opening 31 is preferably smaller than the radius of the first coil opening 51 by equal to or larger than 2 mm. That is to say, the protruding length of the protrusion of the first protruding portion 33 to the hollow portion 5 is equal to or larger than 2 mm and the user is therefore easy to hook his (her) finger to the first protruding portion 33. The first film opening 31 preferably has such size that the user's finger can be put therein. For example, the diameter of the first film opening 31 is preferably equal to or larger than 15 mm. The protruding length of the protrusion of the first protruding portion 33 to the hollow portion 5 is appropriately set to be equal to or larger than 2 mm while ensuring the diameter of the first film opening 31 to be equal to or larger than 15 mm.

The second film opening 32 is not required to enable the user to hook his (her) finger thereto. Therefore, the second film opening 32 has the diameter larger than the first film opening 31, thereby reducing the area of the covering film 3. Accordingly, the covering film 3 is reduced in cost. Further, the diameter of the second film opening 32 is set to be equal to or smaller than that of the second coil opening 52, more preferably substantially equal to that of the second coil opening 52. This can reduce the covering film 3 in cost and prevent exposure of the outer surface of the solder wire coil 2 with the covering film 3 so as to protect the solder wire coil 2.

The covering film 3 can be formed by a heat-shrinkable film, for example. To be specific, the covering film 3 can be formed by externally fitting the heat-shrinkable film formed into a cylinder form, for example, to the solder wire coil 2 in the direction in which the axial line directions of them are identical to each other, and heating the heat-shrinkable film for heat shrinkage. The covering film 3 has enough strength to support the weight of the solder wire coil 2. The thickness of the covering film 3 before the heat shrinkage is set to be, for example, 10 to 300 μm, more preferably approximately 45 μm. The thickness of the covering film 3 after the heat shrinkage is set such that the thickness of a center portion of the outer circumference with less shrinkage is 45 to 50 μm and the thickness of the first protruding portion 33 with large shrinkage is approximately 130 μm. Thus, the thickness of the first protruding portion 33 supporting the weight of the solder wire coil 2 when the user hooks his (her) finger thereto is made larger than that of the outer circumferential portion while reducing the thickness of the outer circumferential portion. With this, the strength of the first protruding portion 33 can be increased while reducing the covering film 3 in cost.

As a material of the heat-shrinkable film that is used for the covering film 3, various heat-shrinkable materials including polyvinyl chloride (PVC), polypropylene (PP), polyethylene (PE), polystyrene (PS), polyolefin (PO), polyethylene terephthalate (PET), polycarbonate (PC), and ethylene vinylalcohol copolymer (EVA), materials provided by combining two layers, such as PE/PET and PP/PE, and materials provided by combining the above-mentioned materials in multiple layers can be used.

The label 4 is bonded to the outer surface of a first end surface region A of the covering film 3, which covers a one end-side end surface (upper end surface in FIG. 1) of the solder wire coil 2, with an adhesive or the like. The outer circumference of the label 4 is set to be substantially equal to or slightly smaller than the outer circumference of the solder wire coil 2. A substantially circular label opening 41 is formed at substantially the center of the label 4. The diameter of the label opening 41 is set to be equal to or smaller than the diameter of the first film opening 31, for example, substantially equal to the diameter of the first film opening 31.

With the above-described configuration, the label 4 covers the first protruding portion 33, so that the first protruding portion 33 is reinforced. As described above, the solder wire bobbinless coil 1 is as large as a fist, which has a diameter of 63 mm and a length of 59 mm, for example, and is very heavy as much as 0.5 kg when the wire diameter of the solder wire 21 is $\Phi$1.2 mm. Therefore, when the user tries to lift the solder wire bobbinless coil 1 by hooking his (her) finger to the first protruding portion 33, there is a risk that the first protruding portion 33 is stretched, gets cracks, and so on, and is damaged. In order to avoid this risk, the label 4 is bonded to the first end surface region A so as to cover the first protruding portion 33. Accordingly, the first protruding portion 33 is reinforced, thereby reducing the risk of the damage of the first protruding portion 33.

Further, the diameter of the label opening 41 is set to be smaller than the diameter of the first film opening 31. With this, a second protruding portion 42 in which the peripheral area of the label opening 41 extends so as to protrude to the inner side of the first protruding portion 33 is formed. As a result, the user's finger is caught by the first protruding portion 33 and the second protruding portion 42 and the user is therefore easy to hook his (her) finger thereto. In this case, the weight is applied to the second protruding portion 42. For this reason, the label 4 is preferably made of a material having such strength that the label 4 is not damaged when the user hooks his (her) finger to the second protruding portion 42 to take out the solder wire bobbinless coil 1 and installs the solder wire bobbinless coil 1 in a soldering device. Examples of the material of the label 4 include a material provided by further coating a high-strength synthetic sheet formed by performing laminate processing on a resin film such as a polyethylene film or paper with resin.

When the covering film 3 is formed by the heat-shrinkable film, the first film opening 31 and the second film opening 32 are formed by shrinkage of the heat-shrinkable film. Accordingly, the sizes of the first film opening 31 and the second film opening 32 tend to vary. On the other hand, the label opening 41 can be formed by punching out the label 4, for example. Therefore, the label opening 41 can be formed with high accuracy. When the size of the label opening 41 is made smaller than those of the first film opening 31 and the second film opening 32, the second protruding portion 42 improves reliability that the protruding portion having a size enabling the user to easily hook his (her) finger thereto can be formed.

The label 4 can be formed by various sheet-like materials such as paper and a resin sheet and various plate-like materials. Various pieces of information such as a manufacturer name, symbols or the like indicating a model, a material, and the like of the solder wire 21, the thickness of the solder wire 21, the weight of the solder wire coil 2, and a lot number are described on the surface of the label 4 at the opposite side to the surface bonded to the first end surface region A.

FIG. 4 is a descriptive view for explaining a state where the solder wire bobbinless coil 1 as illustrated in FIG. 1 is packed in a package box. A package box 6 as illustrated in FIG. 4 includes a rectangular box-like box main body 61 opened to the upper side, an openable and closable lid 63 closing an opening 62 of the box main body 61, and a buffer member 64 arranged in the box main body 61. As the buffer member 64, for example, a buffer material such as expanded polystyrene can be used.

A plurality of recesses 641 configured to be capable of receiving the solder wire bobbinless coils 1 are formed in the buffer member 64. Thus, the lid 63 is closed in a state where the solder wire bobbinless coils 1 are put in the plurality of recesses 641 formed in the buffer member 64, respectively, for transportation. The recesses 641 have depths capable of receiving the whole solder wire bobbinless coils 1 and upper portions of the solder wire bobbinless coils 1 accommodated in the recesses 641 do not project from the upper surface of the buffer member 64.

The user can easily take the solder wire bobbinless coil 1 out of the package box 6 by opening the lid 63, inserting his (her) finger into the label opening 41 and the first film opening 31, and hooking his (her) finger to the first protruding portion 33 and the second protruding portion 42 so as to pull out the solder wire bobbinless coil 1.

Alternatively, like a package box 6a as illustrated in FIG. 5, recesses 641a of a buffer member 64a are formed to be shallower than the lengths of the solder wire bobbinless coils 1 and the upper portions of the solder wire bobbinless coils 1 accommodated in the recesses 641a project from the upper surface of the buffer material 64a in some cases. In this case, the outer circumference of the solder wire bobbinless coil as described in the related art is smoothly covered by the heat-shrinkable film and is slippery when held with his (her) hand because no hook is formed thereon, and the user is therefore easy to drop it due to its weight.

On the other hand, in the case of the solder wire bobbinless coil 1, as illustrated in FIG. 6, the user can hold the solder wire bobbinless coil 1 by hooking his (her) finger to the first protruding portion 33. Therefore, the user is easy to take the solder wire bobbinless coil 1 out of the package box 6a and is easy to hold the solder wire bobbinless coil 1 after taking it out of the package box 6a. In particular, as illustrated in FIG. 6, the user can hold the solder wire bobbinless coil 1 stably by hooking his (her) forefinger to the first protruding portion 33 and pinching the outer circumference of the solder wire bobbinless coil 1 with his (her) thumb and middle finger.

When the solder wire bobbinless coil 1 is used for hand soldering, for example, it can be used by drawing out the solder wire 21 from the label opening 41 and the first film opening 31. However, when the solder wire bobbinless coil 1 is used in an automatic machine, for example, it is desired to be used in a state where a bobbin is attached to the solder wire coil 2 in some cases.

FIG. 7 is a descriptive view for explaining attachment, to the solder wire coil 2, of a bobbin including a cylindrical shaft body 72 with a flange 71 formed on one end portion, and a flange member 73 capable of being attached to the other end side of the shaft body 72. First, the covering film 3 is detached from the solder wire bobbinless coil 1 and the shaft body 72 is inserted into the hollow portion 5 from the second coil opening 52 side. In this case, the shaft body 72 can be smoothly inserted into the hollow portion 5 because the inner wall 53 of the hollow portion 5 has the tapered shape which is reduced in diameter as is farther from the second coil opening 52 to the first coil opening 51 along the axial line direction of the solder wire coil 2.

After the shaft body 72 is attached to the solder wire coil 2 in this manner, the flange member 73 is attached to the front end of the shaft body 72 from the first coil opening 51 side. Thus, the bobbin can be attached to the solder wire coil 2. It should be noted that the covering film 3 may be detached after the shaft body 72 or the shaft body 72 and the flange member 73 is/are attached to the solder wire coil 2 without detaching the covering film 3.

Alternatively, like a solder wire coil 2a as illustrated in FIG. 8, the inner wall of the hollow portion 5 may have an other end-side reduced diameter portion 54 (first reduced diameter portion) which is reduced in diameter as is farther from the second coil opening 52 along the axial line direction of the solder wire coil 2a and a one end-side reduced diameter portion 55 (second reduced diameter portion) which is reduced in diameter as is farther from the first coil opening 51 along the axial line direction of the solder wire coil 2a.

With the solder wire coil 2a, even when the shaft body 72 is inserted from either of the second coil opening 52 side or the first coil opening 51 side, the shaft body 72 can be smoothly inserted into the hollow portion 5. Accordingly, the user is not required to take the direction of the solder wire coil 2a when inserting the shaft body 72 into consideration, thereby improving operability.

The solder wire coil 2a can be formed by winding the solder wire around two solder wire winding-up tools having truncated conical shapes, for example, in a state where the end surfaces of the two solder wire winding-up tools at the small-diameter sides are bonded to each other. It is sufficient that the two solder wire winding-up tools are detached from both sides of the solder wire coil 2a. Alternatively, a solder wire winding-up tool having the configuration in which comb-like members formed by aligning bar bodies in a comb-like form along the circumferences thereof are combined such that comb teeth are engaged with each other, and the bar bodies of both of the comb-like members thereby form winding-up shafts of the solder wire may be employed. In such a solder wire winding-up tool, the diameters of the winding-up shafts formed by both of the comb-like members are set to be large in the vicinity of both ends and to be small in the vicinity of the centers. Thus, the solder wire coil 2a can be formed.

The solder wire coil 2a has the other end-side reduced diameter portion 54 and the one end-side reduced diameter portion 55. Therefore, the solder wire winding-up tool can be easily detached after the solder wire coil 2a is formed.

It should be noted that the solder wire coil 2a may not include the one end-side reduced diameter portion 55. The inner wall of the hollow portion 5 may have a cylindrical shape of a constant diameter. In addition, the solder wire bobbinless coil 1 may not necessarily include the label 4. The second film opening 32 may not be necessarily larger than the first film opening 31. The diameter of the second film opening 32 and the diameter of the first film opening 31 may be substantially the same or the diameter of the second film opening 32 may be smaller than the diameter of the first film opening 31.

Moreover, the solder wire bobbinless coil is not necessarily covered by the covering film 3 and the solder wire coil 2 or 2a may be formed as the solder wire bobbinless coil as it is.

That is to say, the solder wire bobbinless coil may be a solder wire coil formed by winding the solder wire into the hollow columnar form, wherein the inner wall of the hollow portion of the solder wire coil has a first reduced diameter portion which is reduced in diameter as is farther from one opening of the hollow portion along the axial line direction of the solder wire coil.

With this configuration, attachment of the bobbin to the solder wire coil becomes easy.

Further, it is preferable that the inner wall of the hollow portion be reduced in diameter as is farther from the one opening of the hollow portion to the other opening along the axial line direction of the solder wire coil.

With this configuration, when the solder wire coil is manufactured, detachment of the solder wire winding-up tool from the solder wire coil becomes easy. Therefore, the solder wire coil is easily manufactured.

Moreover, it is preferable that the inner wall of the hollow portion have a second reduced diameter portion which is reduced in diameter as is farther from the other opening of the hollow portion along the axial line direction of the solder wire coil.

With this configuration, when the bobbin is attached through any one of the openings of the hollow portion at both sides, the attachment of the bobbin to the solder wire coil becomes easy.

REFERENCE SIGNS LIST

1 Solder wire bobbinless coil
2, 2a Solder wire coil
3 Covering film
4 Label
5 Hollow portion
6, 6a Package box
21 Solder wire
31 First film opening
32 Second film opening
33 First protruding portion
41 Label opening
42 Second protruding portion
51 First coil opening
52 Second coil opening
53 Inner wall
54 Other end-side reduced diameter portion
55 One end-side reduced diameter portion
61 Box main body
62 Opening
63 Lid
64, 64a Buffer member
71 Flange
72 Shaft body
73 Flange member
641, 641a Recess
A First end surface region

The invention claimed is:
1. A solder wire bobbinless coil comprising:
a solder wire coil formed by winding a solder wire into a hollow columnar, the solder wire coil having a first coil opening at one end of the hollow columnar, and a second coil opening at the other end of the hollow columnar; and a covering film covering an outer surface of the solder wire coil, wherein the covering film has a first film opening diameter smaller than the first coil opening diameter on a portion covering the first coil opening and a second film opening diameter equal to or smaller than the second coil opening diameter on a portion covering the second coil opening, and wherein a thickness of the covering film at the first film opening is larger than a thickness of other portion of the covering film, the other portion being away from the first film opening and covering the outer circumferential surface of the solder wire coil.

2. The solder wire bobbinless coil according to claim 1, wherein the first film opening is smaller than the second film opening.

3. The solder wire bobbinless coil according to claim 1, wherein a label on which a label opening equal to or smaller than the first film opening is formed at a substantially center position is bonded to an outer surface of a first end surface region of the covering film, which covers an end surface of the solder wire coil at the one end side.

4. The solder wire bobbinless coil according to claim 3, wherein a diameter of the label opening is less than the diameter of the first film opening.

5. The solder wire bobbinless coil according to claim 1, wherein an inner wall of the hollow columnar reduces in diameter from the second coil opening to the first coil opening along a vertical axis of the solder wire coil.

6. The solder wire bobbinless coil according to claim 1, wherein an inner wall of the hollow columnar reduces in diameter from the second coil opening toward a middle of the hollow columnar along a vertical axis of the solder wire coil, and from the first coil opening toward the middle of the hollow columnar along the vertical axis of the solder wire coil.

* * * * *